United States Patent
Varatharajan et al.

(10) Patent No.: US 7,650,744 B2
(45) Date of Patent: Jan. 26, 2010

(54) SYSTEMS AND METHODS OF REDUCING $NO_x$ EMISSIONS IN GAS TURBINE SYSTEMS AND INTERNAL COMBUSTION ENGINES

(75) Inventors: Balachandar Varatharajan, Clifton Park, NY (US); Chellappa Balan, Niskayuna, NY (US); Michael John Bowman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 526 days.

(21) Appl. No.: 11/388,466

(22) Filed: Mar. 24, 2006

(65) Prior Publication Data

US 2007/0220896 A1 Sep. 27, 2007

(51) Int. Cl.
*F02B 43/00* (2006.01)
(52) U.S. Cl. ................ 60/39.12; 60/39.461; 60/726
(58) Field of Classification Search ............... 60/39.12, 60/39.461, 726, 727
See application file for complete search history.

(56) References Cited

U.S. PATENT DOCUMENTS

| | | | | |
|---|---|---|---|---|
| 5,177,952 A * | 1/1993 | Stone | ................ | 60/775 |
| 5,413,476 A | 5/1995 | Baukal, Jr. et al. | | |
| 5,459,994 A * | 10/1995 | Drnevich | ................ | 60/783 |
| 5,802,875 A | 9/1998 | Drnevich | | |
| 5,960,777 A | 10/1999 | Nemser et al. | | |
| 6,148,602 A * | 11/2000 | Demetri | ................ | 60/775 |
| 6,401,445 B1 * | 6/2002 | Demetri | ................ | 60/776 |
| 6,401,455 B1 * | 6/2002 | Mathes et al. | ................ | 60/286 |
| 6,722,352 B2 | 4/2004 | Smolarek et al. | | |
| 6,887,609 B2 * | 5/2005 | Kaufmann | ................ | 429/34 |
| 7,363,764 B2 * | 4/2008 | Griffin et al. | ................ | 60/780 |
| 2001/0000863 A1 | 5/2001 | Marin et al. | | |
| 2003/0136147 A1 * | 7/2003 | Brugerolle et al. | ................ | 62/650 |
| 2005/0161044 A1 | 7/2005 | Yoshida et al. | | |

FOREIGN PATENT DOCUMENTS

WO  WO 2004/065849 A1  8/2004

* cited by examiner

*Primary Examiner*—Michael Cuff
*Assistant Examiner*—Phutthiwat Wongwian
(74) *Attorney, Agent, or Firm*—Francis T. Coppa

(57) ABSTRACT

A gas turbine systems of reducing $NO_X$ emissions and enhancing operability comprises a compressor; a combustor disposed downstream of and in fluid communication with the compressor; a turbine assembly disposed down stream of and in fluid communication with the combustor; an oxygen-enriched gas source disposed in selective fluid communication with the compressor, the combustor, or a combination of the foregoing, wherein the oxygen-enriched gas source is a pressure swing absorption system, an electrolyzer, or a membrane reactor.

2 Claims, 4 Drawing Sheets

SYSTEMS AND METHODS OF REDUCING NO$_x$ EMISSIONS IN GAS TURBINE SYSTEMS AND INTERNAL COMBUSTION ENGINES

BACKGROUND

The present disclosure generally relates to systems and methods of reducing NO$_X$ emissions in gas turbine systems and internal combustion engines, and particularly to systems and methods of making and using oxygen-enriched gases to reduce NO$_X$ emissions in gas turbine systems and internal combustion engines.

Air pollution concerns worldwide have led to stricter emissions standards. These standards regulate the emission of oxides of nitrogen (NO$_X$) (e.g., nitric oxide (NO), nitrogen dioxide (NO$_2$), and nitrous oxide (N$_2$O)), unburned hydrocarbons (HC), and carbon monoxide (CO), which are generated as a result of gas turbine system operation or internal combustion (IC) engine operation. For example, NO$_X$ is formed within a gas turbine system as a result of high flame temperatures (e.g., greater than or equal to about 2,600° F. (1,427° C.).

In gas turbine systems, attempts have been made to reduce NO$_X$ emissions by increasing airflow through the gas turbine system during operating conditions to control flame temperatures. Other attempts to reduce NO$_X$ emissions include water injections, and lean premixed systems. However, often these modifications to a gas turbine system have an adverse effect on operating performance levels of the gas turbine system.

Accordingly, a continual need exists for improved systems and methods of reducing NO$_X$ emissions in gas turbine systems, as well as improved systems and methods of reducing NO$_X$ emissions in internal combustion engines, which minimize adverse effects on operating performance.

BRIEF SUMMARY

Disclosed herein are systems and methods of reducing NO$_X$ emissions in gas turbine systems and internal combustion engines.

In one embodiment, a gas turbine system comprises a compressor; a combustor disposed downstream of and in fluid communication with the compressor; a turbine assembly disposed downstream of and in fluid communication with the combustor; and an oxygen-enriched gas source disposed in selective fluid communication with the compressor, the combustor, or a combination of the foregoing, wherein the oxygen-enriched gas source is a pressure swing absorption system, an electrolyzer, or a membrane reactor.

In one embodiment, a method of reducing NO$_X$ emissions and increasing operability of combustion systems comprises generating an oxygen-enriched gas using an oxygen-enriched gas source; and selectively introducing the oxygen-enriched gas into a combustor of a gas turbine system or an internal combustion engine, wherein the oxygen-enriched gas source is disposed upstream of the combustor or the internal combustion engine.

In one embodiment, a combustor system comprises an oxygen-enriched gas source, wherein the oxygen-enriched gas source is a pressure swing absorption system, an electrolyzer, or a membrane reactor; and an internal combustion engine disposed downstream of and in fluid communication with the oxygen-enriched gas source.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Disclosed herein are systems and methods of reducing NO$_X$ emissions in gas turbine systems and internal combustion engines (e.g., compression ignition engines and spark ignition engines). For ease in discussion, embodiments are discussed in relation to gas turbine systems with the understanding that one skilled in the art can readily apply these teachings to internal combustion engines or other combustion engines. As will be discussed in greater detail, pressure swing absorption (PSA) systems, electrolyzers, or membrane reactors can be used to produce an oxygen-enriched gas stream that when properly utilized in the combustion chamber of a gas turbine system reduces NO$_X$ emissions compared to a gas turbine system that does not employ an oxygen-enriched gas. Additionally, it is to be understood that the systems and methods discussed below can also be used in combination with Integrated Gasification Combined Cycle (IGCC) systems, where an air separation unit (ASU) is present.

In the descriptions that follow, the term "oxygen-enriched" gas generally refers to a gas having an oxygen concentration that is greater than an oxygen concentration that is present in air under standard conditions (e.g., 21 volumetric percent oxygen). The term "axial" refers broadly to a direction parallel to the axis about which the rotating components of the gas turbine engine rotate. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction.

Figure 1:
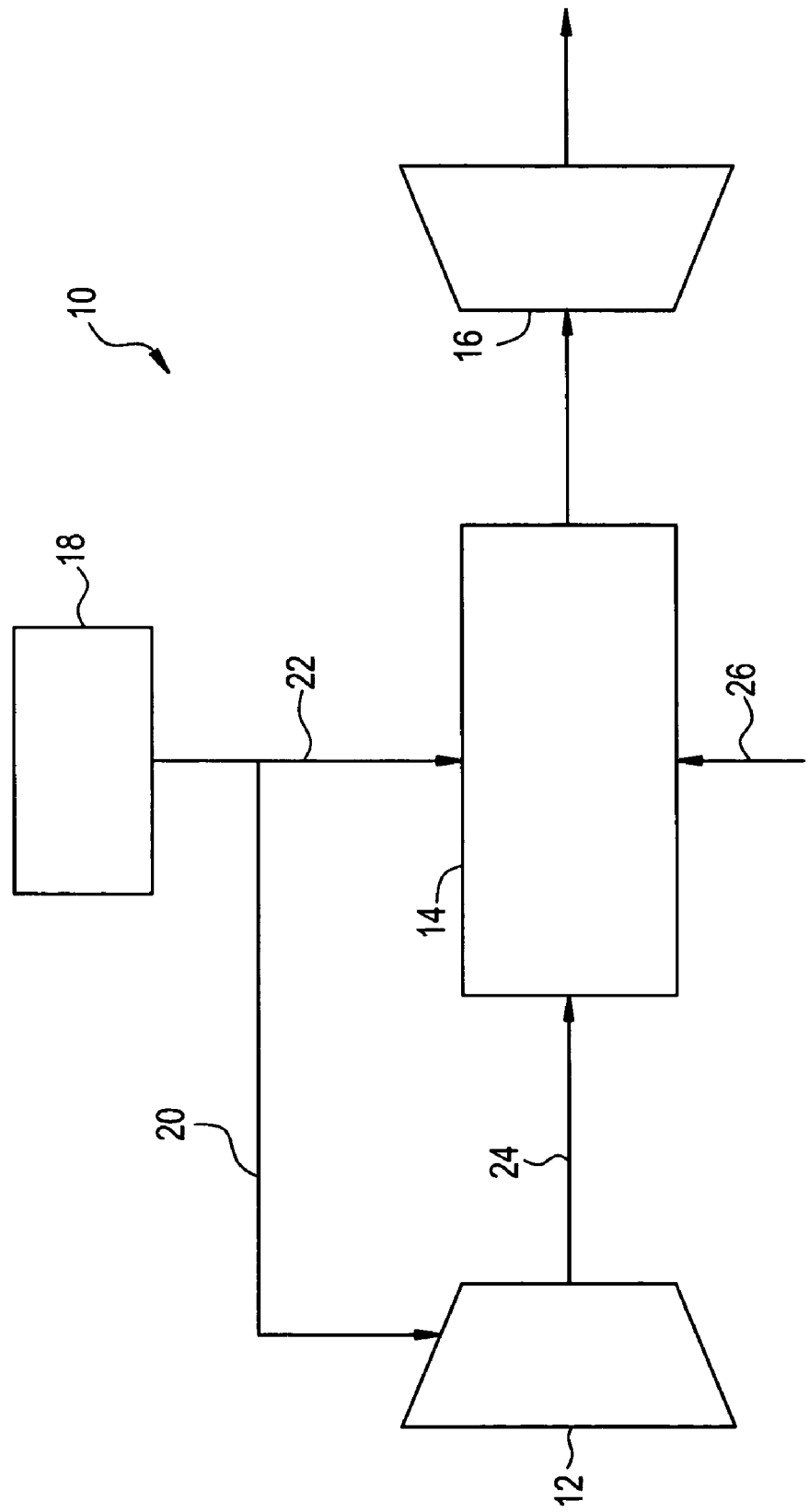
FIG. 1 is a schematic illustration of an embodiment of a gas turbine system.

FIG. 1 illustrates an exemplary gas turbine system, generally designated 10. The gas turbine system 10 comprises a compressor 12, a combustor 14, a turbine assembly 16, and an oxygen-enriched gas source 18. In one embodiment, the compressor 12 is located upstream of and in fluid communication with the combustor 14, which is located upstream of and in fluid communication with the turbine assembly 16. Stated another way, the compressor 12 is in serial fluid communication with the combustor 14 and the turbine assembly 16. The gas turbine system 10 is employed in both mobile applications (e.g., aircrafts and tanks) and stationary applications (e.g., power plants).

During operation, the compressor 12 generally compresses an oxygen containing gas (e.g., air), and supplies the compressed air to the combustor 14. An oxygen-enriched gas stream, generally designated 20, is controllably fed to the compressor 12, which acts as a mixer to mix the oxygen-enriched gas with the air. Additionally or alternatively, an oxygen-enriched gas stream is fed directly to the combustor 14, as indicated by oxygen-enriched gas stream 22. It is to be understood that the oxygen-enriched gas streams 20 and 22 can be pure oxygen or can contain various other gases (e.g., nitrogen, carbon dioxide, argon, and the like) in addition to oxygen. The composition of the oxygen-enriched gas streams 20 and 22 depend on the type of oxygen-enriched gas source 18 and the desired application of the gas turbine system 10. The flow of oxygen-enriched gas streams 20 and 22 is controlled by any suitable method (e.g., valves).

In one embodiment, the oxygen-enriched gas stream (e.g., 20 and 22) comprises greater than or equal to about 30 volumetric percent oxygen. Within this range, the oxygen-enriched gas stream can be greater than or equal to about 40 volumetric percent oxygen, specifically greater than or equal to about 50 volumetric percent oxygen. Also within this range, the oxygen-enriched gas stream can be less than or equal to about 99 volumetric percent oxygen, specifically less than or equal to about 80 volumetric percent oxygen. In other embodiments, the oxygen-enriched gas stream comprises 100 volumetric percent oxygen, i.e., the oxygen-enriched gas stream is pure oxygen.

The combustor 14 receives gases from the compressor 12 illustrated by stream 24, which has been oxygen-enriched. In other embodiments, the combustor receives an oxygen-enriched stream 22 directly from the oxygen-enriched gas source 18. Various injection schemes are discussed in greater detail below. Fuel from a fuel source (not shown) is also fed to the combustor 14, which is indicated by fuel stream 26. A few examples of fuel types include, but are not limited to, hydrogen, distillate fuels and natural gas. Exemplary distillate fuels include, but are not limited to, diesel fuel #2, Jet A fuel, kerosene and JP8.

The use of oxygen-enriched gases in the combustor 14 allows the combustor 14 to operate over a wider regime than would be the case if air alone were employed as an oxygen source. Stated another way, use of oxygen-enriched gases enhances the lean blow out temperature of the combustor 14, i.e., a flame blow out in the combustor 14 occurs at a lower temperature compared to the flame blow out when no oxygen enriched gases are employed (e.g., air only). A lowering of the lean blow out temperature thereby reduces $NO_X$ emissions, since the overall operating temperature regime is lowered.

Additionally, in various embodiments, generation of the oxygen-enriched gas allows the gas turbine system 10 to operate at a substantially constant load, e.g., a load fluctuation of less than or equal to about 20 percent, specifically less than or equal to 10 percent. For example, in one embodiment, the gas turbine system 10 is used for electricity generation. The electricity can be used with an electroloyzer to produce and store oxygen and nitrogen, when the load falls below the capacity of the gas-turbine system for electricity generation.

The turbine assembly 16 can include axial flow assemblies, radial flow assemblies, cross flow assemblies, and the like. The turbine assembly 16 comprises at least one turbine stage. In one embodiment, the turbine stage comprises a stator and a rotor. The stator is fixed, i.e., does not rotate like the rotor, and acts to direct flow. In various other embodiments, the turbine assembly 16 does not employ a stator. Rather, the flow is directed by appropriately angling outlets of the combustor 14. Additionally/alternatively, the flow is directed by counter-rotating turbines. The turbine assembly 16 is used to provide thrust via the expulsion of the exhaust gases, to provide mechanical power by rotating a shaft connected to one of the turbines, or to provide a combination of thrust and mechanical power. In one embodiment, a shaft or shafts driven by one or more of the turbine stages power the compressor 12. Further, this energy can be used to power a vehicle (such as an airplane, a helicopter, a tank, or the like), a power-generation facility or assembly, the gas turbine engine itself, and the like.

The oxygen-enriched gas source 18 is disposed in selective fluid communication with at least the combustor 14, and is generally disposed upstream of the combustor 14. In various embodiments, the oxygen-enriched source is disposed in selective fluid communication with the compressor 12. The oxygen-enriched source 18 is: 1) a pressure swing absorption (PSA) system, 2) an electrolyzer, or 3) a membrane reactor. The choice of system depends on the desired application. For example, use of an electrolyzer is particularly useful in non-mobile (i.e., stationary applications) where water is readily available. However, each of these three systems is adapted for use in both mobile applications and stationary applications. It is to be understood that the oxygen-enriched gas source 18 can optionally include an air separation units (ASU) employed in Integrated Gasification Combined Cycle (IGCC) systems. The ASU includes both cryogenic plants and non-cryogenic plants that separate oxygen and nitrogen from air.

In one embodiment, the oxygen-enriched gas source 18 is a pressure swing absorption (PSA) system. PSA systems are effective in producing low cost oxygen on-site and on-demand. In a PSA system, oxygen is separated from air using a molecular sieve, which is typically a zeolite. Generally, air comprises 79 volumetric percent nitrogen, 21 volumetric percent oxygen, 0.9 volumetric percent argon, with the balance being made of other gases. During operation, air is passed through the molecular sieve at a pressure sufficient to adsorb nitrogen from the air onto the molecular sieve, while allowing other gases, namely oxygen, to pass through the molecular sieve. The resulting oxygen effluent stream is enriched in oxygen. While the purity of the oxygen-enriched streams 20 and 22 varies depending on the application, in some embodiments, the streams comprise greater than or equal to about 90 volumetric percent oxygen.

Periodically, the molecular sieves become saturated with nitrogen and needs to be regenerated. During a regeneration mode of operation, air and/or oxygen is introduced to the molecular sieve. As the air and/or oxygen contacts the nitrogen that is absorbed on the molecular sieve, the nitrogen is desorbed and is vented to the atmosphere or fed to the combustor 14.

In another embodiment, the oxygen-enriched gas source 18 is an electrolyzer. Generally, an electrolyzer comprises at least one electrochemical cell. More particularly, an electrochemical cell comprises an anode and a cathode disposed on opposite sides of an electrolyte (e.g., a proton exchange membrane (PEM)). During operation, an electrical current is applied to electrodes (i.e., the anode and the cathode), which electrolyzes water ($H_2O$) to hydrogen gas ($H_2$) and oxygen gas ($O_2$). Like the PSA system, the electrolyzer allows on-site and on-demand generation of oxygen-enriched gas. The purity of the gas varies depending on the desired application, but in some embodiments the oxygen gas concentration is greater than or equal to 90 volumetric percent.

The oxygen generated from the electrolyzer is fed to the compressor 12 and/or the combustor 14 as illustrated by oxygen-enriched gas streams 20 and 22. Further, this embodiment advantageously produces hydrogen gas, which can be mixed with the fuel. When hydrogen is mixed with the fuel, the combustor can operate leaner while avoiding flame blow-out compared to systems where hydrogen gas is not mixed with the fuel. In other embodiments, the hydrogen is introduced and mixed with the fuel stream 26 prior to entering the combustor 14. Alternatively, the hydrogen is fed directly to the combustor 14. Moreover, it is further noted that by feeding both oxygen and hydrogen from the electrolyzer that the oxygen mixes with the fuel to create oxygenated fuels, which prevents coking (i.e., carbon formation) in the combustor 14.

In yet another embodiment, the oxygen-enriched gas source 18 is a membrane reactor. In the membrane reactor, oxygen is separated from air or other gas mixtures in which oxygen ($O_2$) is a component. More particularly, the membrane reactor generally comprises a dense ceramic material (e.g., a perovskite) that acts as an oxygen permeable membrane. A catalyst material is disposed on the membrane. During operation, oxygen gas that is present in the air or other gas mixture is reduced to oxygen anions at the membrane surface. The oxygen anions are subsequently transported through the membrane, typically via applying a vacuum to one side of the membrane. After being transported through the membrane, the oxygen anions recombine to form oxygen gas releasing electrons. This resulting oxygen-enriched gas is represented as oxygen-enriched gas streams 20 and 22. Stated another way, the oxygen-enriched gas produced by the membrane reactor is fed to the compressor 12 and/or the combustor 14 as indicated by oxygen-enriched gas streams 20 and 22. In one embodiment, nitrogen gas generated using the membrane reactor is also used in the combustor 14.

It is to be further understood that the gas turbine system 10 can be modified, as understood by those skilled in the art, to include various other components that are typically employed in gas turbine engines. While components vary depending on the application, exemplary additional components include, but are not limited to, fuel injection systems, turbofan(s), ram ducts, valves, control systems (e.g., a computer), and the like. Moreover, the gas turbine system 10 can be adapted to be employed in both turbofan and turboshaft engines.

Figure 2:
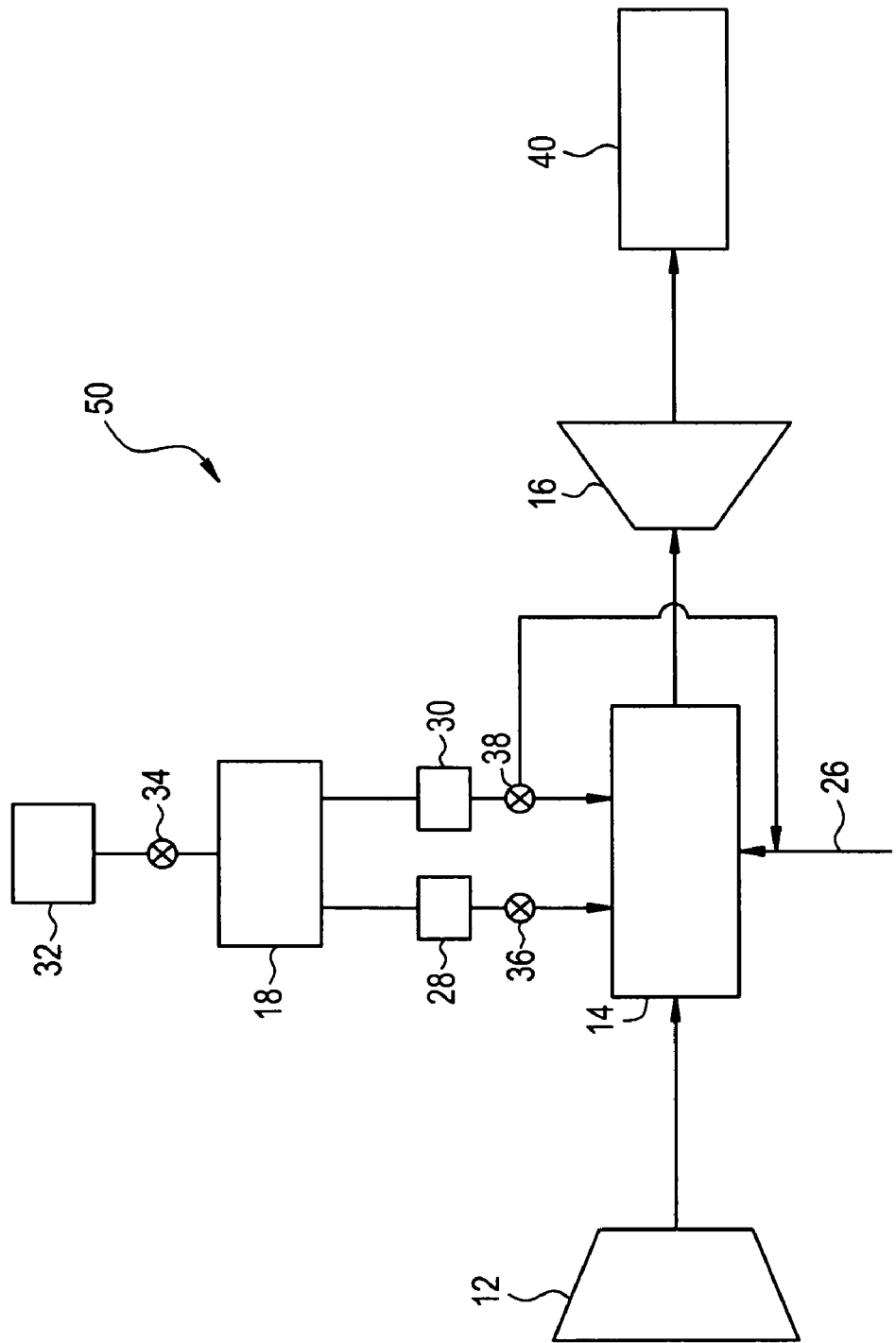
FIG. 2 is a schematic illustration of another embodiment of a gas turbine system.

FIG. 2 illustrates another embodiment of a gas turbine system, generally designated 50, showing optional additional features. The gas turbine system 50 comprises a compressor 12, a combustor 14, a turbine assembly 16, and an oxygen-enriched gas source 18. In one embodiment, the compressor 12 is located upstream of and in fluid communication with the combustor 14, which is located upstream of and in fluid communication with the turbine assembly 16. Details of each of these components are discussed above in relation to gas turbine system 10 (FIG. 1).

The gas turbine system 50 further comprises optional effluent storage tanks 28 and 30, and an optional oxygen source storage tank 32. The oxygen source storage tank 32 is disposed in selective fluid communication with the oxygen-enriched gas source 18 via optional valve 34. The oxygen source stored within oxygen source storage tank 32 varies depending on the system selected for oxygen-enriched gas source 18. For example, when the oxygen-enriched gas source 18 is an electrolyzer, the oxygen source is water, which is used to create an oxygen-enriched gas and hydrogen gas. In yet other embodiments, for example, when the oxygen-enriched gas source 18 is a membrane reactor, oxygen source storage tank 32 can be used to store air or can be omitted altogether.

In embodiments where the oxygen-enriched gas source 18 is the electrolyzer, the oxygen-enriched gas created in the electrolyzer is stored in the effluent storage tank 28, which is disposed in selective fluid communication with the combustor 14 via valve 36. Similarly, the hydrogen created in the electrolyzer is stored in the effluent storage tank 30. Valve 38 is used to selectively control the flow of hydrogen from the effluent storage tank 30 to the combustor 14 or the fuel stream 26. Similarly, in other embodiments, the effluent storage tank 28 is used to store oxygen-enriched gas, while the effluent storage tank 30 is used to store nitrogen or is omitted. In other words, one of skill in the art will understand that various optional system components can be added or omitted depending on the desired application.

For example, the gas turbine system 50 further comprises an optional generator 40 disposed downstream of and in operable communication with the turbine assembly 16. The generator 40 is used to convert mechanical energy from the rotating turbine assembly into electrical energy. This embodiment is particularly useful in stationary applications such as power plants. In other embodiments, the generator is omitted, since the desired output of the system is thrust caused by the expulsion of exhaust gases, rather than electrical power as the output.

Additionally, the gas turbine system 50 can further comprise additional optional components, as readily understood by those skilled in the art. For example, a heat recovery steam generator (HRSG) (not shown) can be disposed downstream of and in fluid communication with the turbine assembly 16 such that exhaust gases form the turbine assembly 16 can be used to generate steam. In one embodiment, the steam is supplied to a steam turbine (not shown) disposed downstream of and in fluid communication with the HRSG. An optional generator (not shown) can be disposed downstream of and in operable communication with the steam turbine to generate electrical power.

Figure 3:
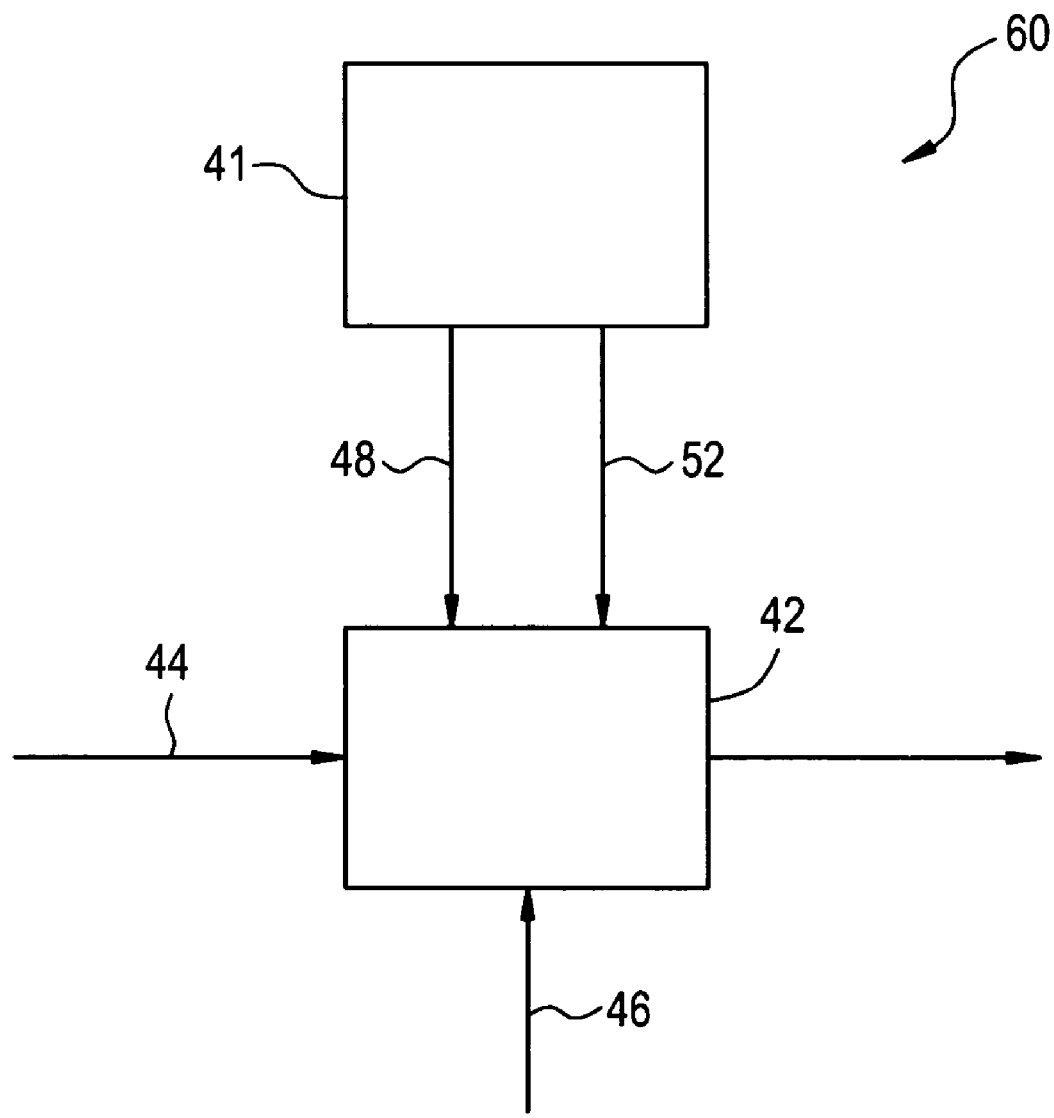
FIG. 3 is a schematic illustration of an embodiment of an internal combustion engine system.

FIG. 3 is an embodiment of an internal combustion engine system, generally designated 60, which illustrates that the principles applied above in relation to gas turbine systems 10 and 50 are equally applicable to internal combustion engines. The internal combustion engine system 60 comprises an oxygen-enriched gas source 41 and an internal combustion engine 42. The internal combustion engine 42 is disposed downstream of and in fluid communication with the oxygen-enriched gas source 41. The oxygen-enriched gas source 41 is similar to the oxygen-enriched gas source 18 discussed above in relation to systems 10 and 50 and includes PSA systems, electrolyzers, or membrane reactors. The internal combustion engine 42 includes both spark ignition engines and compression ignition engines.

During operation, oxygen from a primary oxygen source 44 and fuel from a fuel source 46 are introduced into the internal combustion engine 42. Generally, the primary oxygen source is air. The fuel source varies depending on the type of internal combustion engine, as well as the application in which the engine is being employed. Suitable fuel sources include hydrocarbon fuels such as gasoline, diesel, ethanol, methanol, kerosene, and the like; gaseous fuels, such as natural fluid, propane, butane, and the like; and alternative fuels, such as hydrogen, biofuels, dimethyl ether, and the like; as well as combinations comprising at least one of the foregoing fuels. The fuel is then combusted with the oxygen to generate power.

An oxygen-enriched gas stream 48 from oxygen-enriched gas source 41 is selectively introduced into the internal combustion engine 42. Depending on the application, various other gases may be introduced into the internal as indicated by effluent stream 52. For example, the effluent stream 52 can comprise hydrogen gas, nitrogen gas, or a combination of the foregoing.

It is briefly noted that when these principles are applied to internal combustion engines, a reduction in both $NO_X$ emissions and soot is realized, as well as uniform combustion. Additionally, since the oxygen-enriched gas stream 48 is controllable, oxygen injection can be selectively controlled to allow operation of the internal combustion engine 42 at different loads, which enables homogenous change compression ignition (HCCI).

Figure 4:
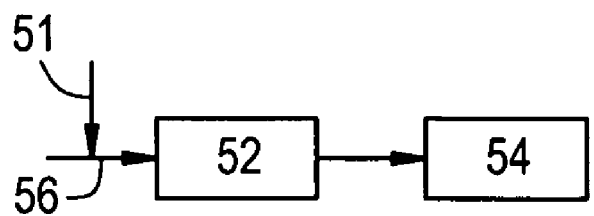
FIG. 4 is a schematic illustration of an embodiment of a method of introducing an oxygen-enriched gas into a combustor.
Figure 5:
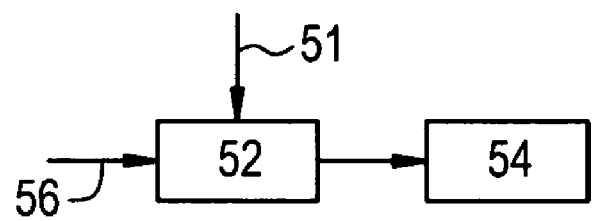
FIG. 5 is a schematic illustration of another embodiment of a method of introducing an oxygen-enriched gas into a combustor.
Figure 6:
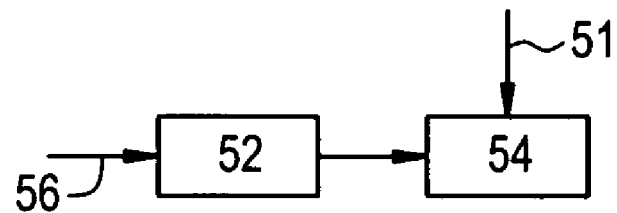
FIG. 6 is a schematic illustration of yet another embodiment of a method of introducing an oxygen-enriched gas into a combustor.

Referring now to FIGS. 4-6, schematic illustrations of various methods of introducing oxygen-enriched gas to the combustor 14 are illustrated. The combustor 14 comprises a primary flame zone 52 and a secondary flame zone 54. FIG. 4 illustrates an oxygen-enriched gas 51 being introduced to an air and fuel mixture 56 upstream of the primary flame zone 52. In this embodiment, flame stability is promoted and $NO_X$ generation is reduced compared to systems where an oxygen-enriched gas is not being employed. FIG. 5 illustrates an embodiment where the oxygen-enriched gas 51 is introduced directly into the primary flame zone 52. Again, this embodiment promotes flame stability and reduces $NO_X$ generation. FIG. 6 illustrates an embodiment where the oxygen-enriched gas 51 is introduced directly into the secondary air zone 54. This embodiment advantageously reduces carbon monoxide (CO) emissions. It is to be understood that various combinations of these methods can be employed depending on the desired application. For example, oxygen-enriched gas 51 can be introduced both upstream of the primary flow zone 52 and directly into the primary flow zone 52. In various embodiments, the oxygen-enriched gas can be introduced as described above in an oscillating fashion. That is, the introduction of the oxygen-enrich gas 51 into the combustor can be passively or actively controlled.

Advantageously, the gas turbine systems and internal combustion engines disclosed in this application allow for leaner combustion and lower flame temperatures, which results in lower emissions, namely $NO_X$ emissions. Moreover, the use of a PSA system, an electrolyzer, or a membrane reactor allows oxygen-enriched gases to be produced on-site and on-demand, which enables the gas turbine system and internal combustion systems disclosed herein to be employed in both mobile applications and stationary applications.

Further, it is advantageously noted that injection of the oxygen-enriched gas in the combustion zone (e.g., primary zone 52 and/or secondary zone 54) of the combustor can reduce the combustion dynamics oscillations, which can increase the operability window enabling leaner temperature and lower $NO_X$ emissions, when compared to lean combustion systems used in gas turbines. Additionally, the injection of oxygen-enriched gas can also lead to decrease in carbon monoxide emission in the combustor. Generally, there is a $NO_X$ versus carbon monoxide tradeoff that limits the lowest temperature at which a combustor can be operated. If carbon monoxide is reduced, oxygen-enriched gas injection can further allow $NO_X$ emission reduction compared to systems where an oxygen-enriched gas is not employed.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A gas turbine system, comprising:
   a compressor;
   a combustor disposed downstream of and directly in fluid communication with the compressor;
   a turbine assembly disposed downstream of and in fluid communication with the combustor; and an oxygen-enriched gas source disposed in selective fluid communication with the compressor and the combustor, via at least one oxygen-enriched gas stream disposed in fluid communication with the oxygen-enriched gas source, the at least one oxygen-enriched gas stream further disposed in selectively direct fluid communication with the compressor and selectively direct fluid communication with the combustor, wherein the oxygen-enriched gas source is a pressure swing absorption system, an electrolyzer, or a membrane reactor.

2. The system of claim 1, wherein the oxygen-enriched gas source is configured to generate an oxygen-enriched gas stream comprising greater than or equal to about 30 volumetric percent oxygen.

* * * * *

UNITED STATES PATENT AND TRADEMARK OFFICE
CERTIFICATE OF CORRECTION

PATENT NO.       : 7,650,744 B2
APPLICATION NO.  : 11/388466
DATED            : January 26, 2010
INVENTOR(S)      : Varatharajan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 659 days.

Signed and Sealed this

Twenty-eighth Day of December, 2010

David J. Kappos
*Director of the United States Patent and Trademark Office*